United States Patent [19]
Laursen

[11] Patent Number: 4,854,631
[45] Date of Patent: Aug. 8, 1989

[54] COMBINATION RECREATIONAL TRANSPORT AND CAMPER VEHICLE

[76] Inventor: Darlene Laursen, 2480 Sunrise Rim, Boise, Id. 83705

[21] Appl. No.: 116,222

[22] Filed: Nov. 3, 1987

[51] Int. Cl.⁴ .......................... B60R 27/00; B60P 3/07
[52] U.S. Cl. .................................... 296/158; 296/24.1; 296/168
[58] Field of Search ........................ 296/156–158, 296/168, 24 R, 1 A, 181, 24 C, 24.1, 24.2; D12/115, 102, 103, 97; 280/400, 789, 89.11, 424; 105/409, 423; 410/24

[56] References Cited

U.S. PATENT DOCUMENTS

| D. 172,714 | 7/1954 | Gray | 296/24 C X |
|---|---|---|---|
| D. 249,667 | 9/1978 | Thompson | D12/97 X |
| 3,734,558 | 5/1973 | Stead | 296/158 |
| 3,877,187 | 4/1975 | Livingston | 296/156 X |
| 3,879,240 | 4/1975 | Wall | 296/156 X |
| 3,923,335 | 12/1975 | Erickson | 296/158 |

FOREIGN PATENT DOCUMENTS

| 0996979 | 9/1976 | Canada | 296/158 |
|---|---|---|---|
| 3321306 | 12/1984 | Fed. Rep. of Germany | 296/156 |
| 2103551 | 2/1983 | United Kingdom | 296/156 |

*Primary Examiner*—Robert J. Oberleitner
*Attorney, Agent, or Firm*—Frank J. Dykas

[57] ABSTRACT

A combination purpose recreational vehicle having a living quarters section and an integral enclosed storage section for carrying smaller all terrain vehicles and the like. The living quarters section adjoins and extends over the enclosed storage section with provision for interior access between the two sections. The vehicle storage section has two opposing access doors located transversely which may be used as loading ramps when fully open and lowered to the ground. Recreational vehicles may be loaded, positioned and secured by appropriate method or unloaded simultaneously when both doors are open.

1 Claim, 2 Drawing Sheets

COMBINATION RECREATIONAL TRANSPORT AND CAMPER VEHICLE

DESCRIPTION

Background of the Invention

1. Technical Field

This invention relates generally to recreational vehicles and more particularly to a new and improved camper trailer adapted for use both as living quarters and a carrier for motor driven cycles, bicylces, all terrain vehicles, snowmobiles and the like.

2. Background Art

As can be appreciated there are innumerable vans, campers, and travel trailers in constant use. In many cases the users have found it desirable to carry with them additional smaller vehicles such as motorcycles for recreational use at their various stopping points. Transportation of these vehicles often involves use of additional smaller trailers or attachment of the vehicles to the larger camper or van by means of racks or platforms. This arrangement exposes the equipment to the elements and to vandalism or theft.

Many and varied cargo vehicles have been devised for transporting vehicles or livestock. Some transport vehicles even contain living quarters. Examples of such vehicles are shown in U.S. Pat. Nos. 3,734,558 and Des. 249,667.

U.S. Pat. No. 3,734,558 describes a dual purpose recreational vehicle having a coach for use as living quarters and a carrier for motor driven cycles and the like. It appears from the description that the unit may be used for living quarters or for vehicle storage but not for both purposes simultaneously. Neither is it clear from the description that the vehicles being carried are fully enclosed and secure and safe during transit or storage.

U.S. Pat. No. Des. 249,667 describes a combined travel and horse trailer which shows loading ramps located on both sides of the trailer. The design does not indicate provisions for safety or security of contents.

This invention provides for full independent enclosure of the transported vehicles at all times during transit or at rest and permits full use of the living quarters at all times. It also provides for fire safety and separate ventilation of the storage compartment to prevent accumulation of noxious fumes from fuel tanks or containers. By the use of opposing side access doors and ramps it permits easy and simultaneous access for the loading, placement and unloading of the transported vehicles.

DISCLOSURE OF INVENTION

The present invention is intended to provide a new and improved recreation vehicle and transport vehicle which has all of the advantages of the prior art and none of the disadvantages.

It is another object of the present invention to provide a vehicle possessing comfortable, conventional living quarters and a cargo carrying space which may be used conveniently for a wide variety of riding motor driven cycles and other recreational vehicles.

It is a further object of the present invention to provide a new and improved recreational and transport vehicle which may be easily and efficiently manufactured.

It is a further object of the present invention to provide a new and improved recreational and transport vehicle which may be of low cost of manufacture with regard to both materials and labor and thus may be solid to the public at low and reasonable prices.

It is another object of the present invention to provide a new and improved recreational and transport vehicle which will prove to be of a durable and rugged construction under extended use situations.

It is a further object of this invention to provide full and independent enclosure of the transport storage area to protect the stored vehicles from dust, dirt, weather, theft and vandalism at all times.

It is also an object of this invention to provide interior access between the living quarters section and the storage section to permit inspection of contents.

It is an object of this invention to provide firewall rated partitions completely enclosing the storage area to protect vehicle and living quarters from fire or other incident possibly arising from the presence of noxious or flammable fumes which may originate from stored fuel or gas tanks.

It is a further object of this invention to provide opposing side access doors to the transport storage area to enable transported vehicles to be loaded, positioned and unloaded easily and simultaneously. These doors also serve as ramps and this feature is especially useful in loading and unloading snowmobiles and all terrain vehicles onto snowbanks or embankments.

These together with other objects of the invention, along with the various features of novelty which characterize the invention, are pointed out with particularity in the claims annexed to and forming a part of this disclosure.

These objects are accomplished by use of a recreation vehicle with a section at one end containing living quarters complete with furnishings and other facilities commonly found in such vehicles and a section at the other end of the recreation vehicle separated from the first section and surrounded by a fire wall and which comprises a storage area with doors on each side for pass through loading and unloading of recreational vehicles such as snowmobiles, motorcycles, all terrain vehicles or the like. The side opening doors are of reinforced construction and hinged at their bases. They may be opened and lowered to the ground to be used as ramps for easy loading of the vehicles. The space above this section contains a sleeping or storage space which is an extension of the living quarters section. Interior access between the living quarters section and the vehicle storage section may be obtained by a door suitably located between the two. Appropriate tie-downs and other positioning means are provided within the storage area to secure the vehicles placed therein.

BEST MODE FOR CARRYING OUT INVENTION

Figure 1:
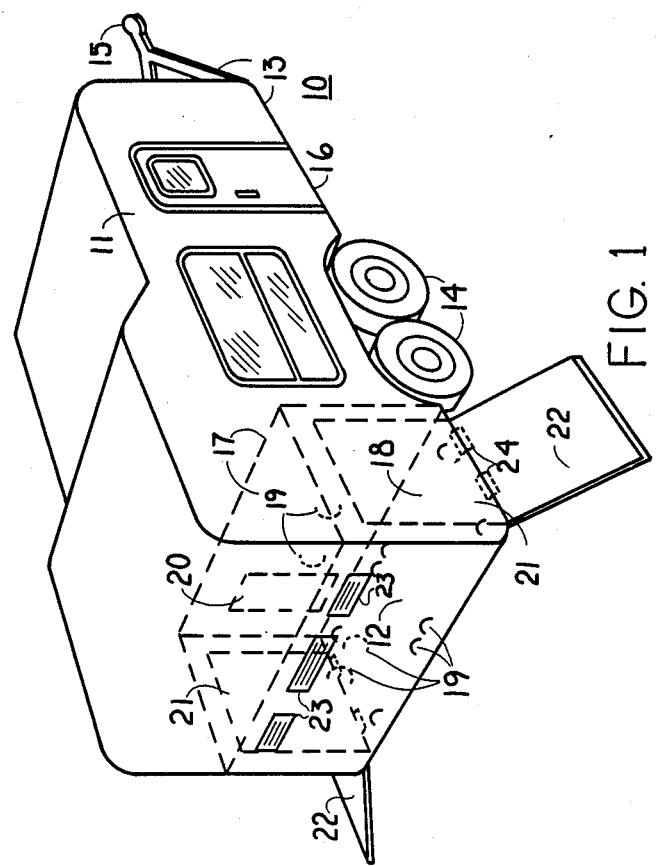
FIG. 1 is a perspective view of a combination recreational transport and camper vehicle.
Figure 2:
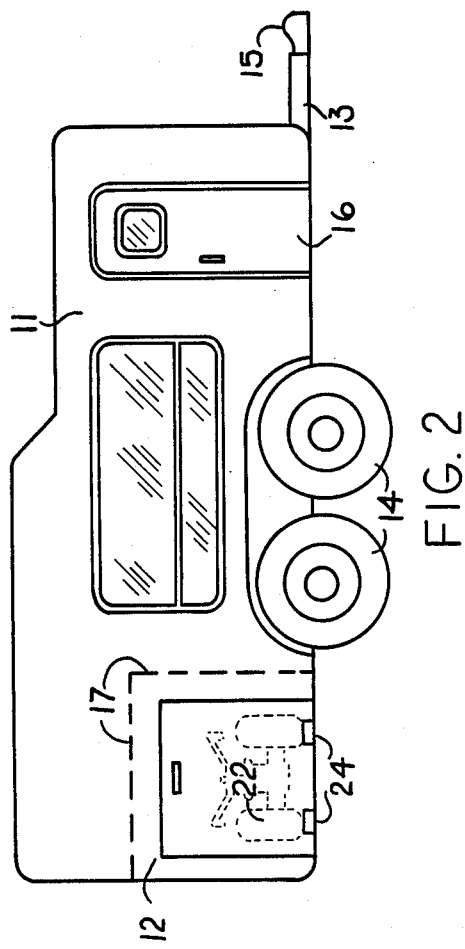
FIG. 2 is a side view of a combination recreational transport and camper vehicle.

With reference now to the drawings and in particular to FIG. 1 thereof, a new and improved recreational and transport vehicle embodying the principles and concepts of the present invention and generally designated by the reference numeral 10 will be described.

Recreational and transport vehicle 10 consists of living quarters section 11 and transport section 12 disposed in a conventional manner within trailer frame 13 which is mounted in a well known manner to ground wheels 14. A conventional towing assembly 15 is attached in an understood manner to the front end of frame 13. Normal access to living quarters section 11 is provided by door 16 in a conventional manner. Of course trailer frame 13 and living quarters section 11 and door 16 and ground wheels 14 and towing assembly 15 are of conventional construction and design and form no part of this invention.

It should also be clearly understood that this type of integral storage compartment and living quarters arrangement can be utilized for trailers and motor homes.

The vertical walls and ceiling of transport section 12 consist of firewall rated partitions 17 which are reinforced and separate the transport section 12 from the living quarters section 11 which adjoins and extends over the transport section 12 in a conventional manner. The firewall rating protects the remainder of the vehicle from fires which may originate in the fuel or lubricants present in the transport section 12. The reinforced walls minimize any damage resulting from vehicles breading loose from moorings. This arrangement also allows full and simultaneous use of both sections of vehicle 10. The fire rated loading deck 18 of the transport section 12 is connected to the walls 17 in an understood manner and is reinforced for load bearing in a conventional way with metal tie-down loops 19 being appropriately attached in a well known manner to deck 18 and walls 17 in order to position and secure any vehicles being transported in transport section 12.

An interior access firewall rated and reinforced door 20 is suitably located in an understood manner vertically in wall 17 separating transport section 12 and living quarters section 11. This arrangement permits visual inspection and safe access when required. On each side of transport section 12 and extending the full width and height of each side is a fire rated door 21 which is specially reinforced for load bearing and is connected in a conventional and understood manner by hinges 24 at its base and attached firmly and mechanically to frame 13. Each door is secured in a well known manner to the exterior door frame when in the closed position. When doors 21 are opened and the horizontal unhinged ends are lowered to the ground the doors become loading ramps 22 to permit ingress and egress of vehicles being stored within transport section 12. The dual purpose design of the doors eliminates the need for separate loading ramps. When both doors are open vehicles may be loaded on one side and unloaded from the opposite side, thus facilitating placement and storage.

Ventilation vents 23 are located appropriately in an understood manner in the firewall rated partitions of the transport section 12 to permit air circulation and prevent collection of noxious or flammable fumes within the storage area emanating from stored vehicles or fuel containers.

While there is shown and described the present preferred embodiment of the invention, it is to be distinctly understood that this invention is not limited thereto but may be variously embodied to practice within the scope of the following claims. Accordingly,

What I claim is:

1. A combination recreational and transport vehicle comprising:

travel trailer means enclosing living quarters and a transport storage means extending to each side of said travel trailer means;

said transport storage means having multiple fire rated wall and deck means defining said transport storage means, an all terrain vehicle stored in said transport storage means;

a pair of load bearing doors located opposite one another hinged to said deck means and disposed to provide direct access to said transport storage means from either side of said travel trailer means, said doors further configured to be lowerable into loading ramp positions to provide ramps for loading said transport storage means from either side;

a fire rated access door located to provide interior communication means between said living quarters and said transport storage means;

a plurality of multiple tie down means disposed within said transport storage means for securing said all terrain vehicle therein; and a plurality of venting means disposed within said transport storage means for ventilating the same.

* * * * *